(12) United States Patent
Jansen

(10) Patent No.: US 10,052,829 B2
(45) Date of Patent: Aug. 21, 2018

(54) METHOD AND DEVICE FOR PRODUCING A HOLLOW PLASTIC OBJECT HAVING AT LEAST ONE TRANSVERSE REINFORCEMENT

(71) Applicant: Thomas GmbH + Co. Technik + Innovation KG, Bremervorde (DE)

(72) Inventor: Klaus Jansen, Buxtehude (DE)

(73) Assignee: Thomas GmbH + Co. Technik + Innovation KG, Bremervörde (DE)

( * ) Notice: Subject to any disclaimer, the term of this patent is extended or adjusted under 35 U.S.C. 154(b) by 702 days.

(21) Appl. No.: 14/406,241

(22) PCT Filed: Jun. 12, 2013

(86) PCT No.: PCT/EP2013/001719
§ 371 (c)(1),
(2) Date: Dec. 8, 2014

(87) PCT Pub. No.: WO2013/189576
PCT Pub. Date: Dec. 27, 2013

(65) Prior Publication Data
US 2015/0137421 A1    May 21, 2015

(30) Foreign Application Priority Data

Jun. 20, 2012 (DE) .......................... 10 2012 012 126
Sep. 18, 2012 (DE) .......................... 10 2012 018 429

(51) Int. Cl.
*B29C 70/68* (2006.01)
*B29D 23/00* (2006.01)

(52) U.S. Cl.
CPC .............. *B29C 70/68* (2013.01); *B29D 23/00* (2013.01); *B29D 23/001* (2013.01)

(58) Field of Classification Search
CPC ....... B29C 70/86; B29C 70/52; B29C 733/58; B29C 53/06; B29C 47/0088;
(Continued)

(56) References Cited

U.S. PATENT DOCUMENTS 1,600,696 A * 9/1926 Murray .................. F16L 1/038
425/406
2,694,661 A * 11/1954 Meyer ..................... B29C 70/44
138/145
(Continued)

FOREIGN PATENT DOCUMENTS

CN    200954685 Y  * 10/2007
DE    3126679 C2     1/1983
(Continued)

OTHER PUBLICATIONS

Deutsches Patent—Und Markenamt (German Patent and Trademark Office), Rechercherbericht on related (search application) (Mar. 28, 2013).
(Continued)

*Primary Examiner* — Seyed Masoud Malekzadeh
*Assistant Examiner* — Taryn Trace Willett
(74) *Attorney, Agent, or Firm* — Laurence P. Colton; Smith Tempel Blaha LLC

(57) ABSTRACT

A core (14) which is typically held in front of the mold (13) is required for producing hollow plastic objects (10). This does not allow for a transverse reinforcement (11) which is formed from a prefabricated reinforcement tube to be pulled over the core (14). A method and device is provided for the core (14) to be held behind the mold (14) when viewed in the production direction (17). In this case, the front end (15) of the core (14), which is located in front of the mold (13), remains free, such that a transverse reinforcement (11) that
(Continued)

has been formed from a prefabricated reinforcement tube can be pulled over the free front end (15) of the core (14).

6 Claims, 6 Drawing Sheets

(58) Field of Classification Search
CPC .............. B29C 47/009; B29C 47/0092; B29C 47/0095; B29C 47/0866; B29C 47/0876; B29C 47/122; B29C 47/34; B29C 67/0022; B29C 67/0025; B29D 23/001; C29D 23/00; F16L 1/038
See application file for complete search history.

(56) References Cited

U.S. PATENT DOCUMENTS

| | | | | |
|---|---|---|---|---|
| 3,181,222 A * | 5/1965 | Palmer | .................... | B28B 1/084 264/228 |
| 3,292,227 A * | 12/1966 | Olds | ..................... | B28B 3/24 249/98 |
| 4,106,300 A * | 8/1978 | McNeill | .................. | E04C 5/012 106/644 |
| 4,117,867 A * | 10/1978 | Pahl | ..................... | B29C 53/607 138/119 |
| 4,772,438 A * | 9/1988 | Watanabe | .............. | B29C 53/582 156/180 |
| 5,036,692 A * | 8/1991 | Tasaki | ..................... | B21D 9/07 72/150 |
| 5,110,526 A * | 5/1992 | Hayashi | ............... | B29C 47/0004 264/127 |
| 5,379,624 A * | 1/1995 | Harman | .................. | B21D 9/073 72/149 |
| 5,424,015 A * | 6/1995 | Matsuda | ................ | B29C 31/002 264/130 |
| 5,556,496 A * | 9/1996 | Sumerak | ................ | B29C 70/525 156/166 |
| 5,820,804 A * | 10/1998 | Elmaleh | ................ | B29C 33/308 156/172 |
| 5,942,171 A * | 8/1999 | Prenger | ............... | B29C 47/0023 264/209.5 |
| 6,009,737 A * | 1/2000 | Bandy | .................... | B21D 7/025 279/2.03 |
| 6,155,091 A * | 12/2000 | Hayes | ...................... | B21D 9/03 403/122 |
| 6,189,354 B1 * | 2/2001 | Spath | ...................... | B21D 7/08 72/150 |
| 6,296,804 B1 * | 10/2001 | Chapman | ............ | B29C 47/0023 264/150 |
| 6,569,371 B1 * | 5/2003 | Asari | ...................... | B29C 70/52 156/229 |
| 7,553,148 B2 * | 6/2009 | Takamatsu | ............. | B21D 9/073 264/339 |
| 8,066,922 B2 * | 11/2011 | Jansen | .................. | B29C 70/525 156/180 |
| 9,156,210 B2 * | 10/2015 | Gibson | .................... | B29C 70/52 |
| 9,365,018 B2 * | 6/2016 | Drewes, Jr. | ........ | A61M 25/0012 |
| 9,393,741 B2 * | 7/2016 | Jansen | .................. | B29C 70/523 |
| 9,567,760 B2 * | 2/2017 | Bussio | .................... | F16L 1/038 |
| 2005/0210946 A1 * | 9/2005 | Cappello | ................ | B21D 9/073 72/150 |
| 2015/0059911 A1 * | 3/2015 | Petrov | .................... | F16L 13/02 138/172 |
| 2015/0367584 A1 * | 12/2015 | Daton-Lovett | ....... | B29C 70/504 264/171.13 |
| 2016/0288431 A1 * | 10/2016 | Buehler | ................ | B29C 70/528 |
| 2016/0339604 A1 * | 11/2016 | Jansen | .................... | B29C 70/52 |

FOREIGN PATENT DOCUMENTS

| | | |
|---|---|---|
| DE | 4402984 A1 | 8/1995 |
| EP | 0211535 A1 | 2/1987 |
| JP | S5949954 A | 3/1984 |
| WO | 2010089863 A1 | 8/2010 |
| WO | WO-2010089863 A1 * | 8/2010 ........... B29C 70/222 |

OTHER PUBLICATIONS

WIPO, International Search Report on parent application (dated Sep. 25, 2013).

* cited by examiner

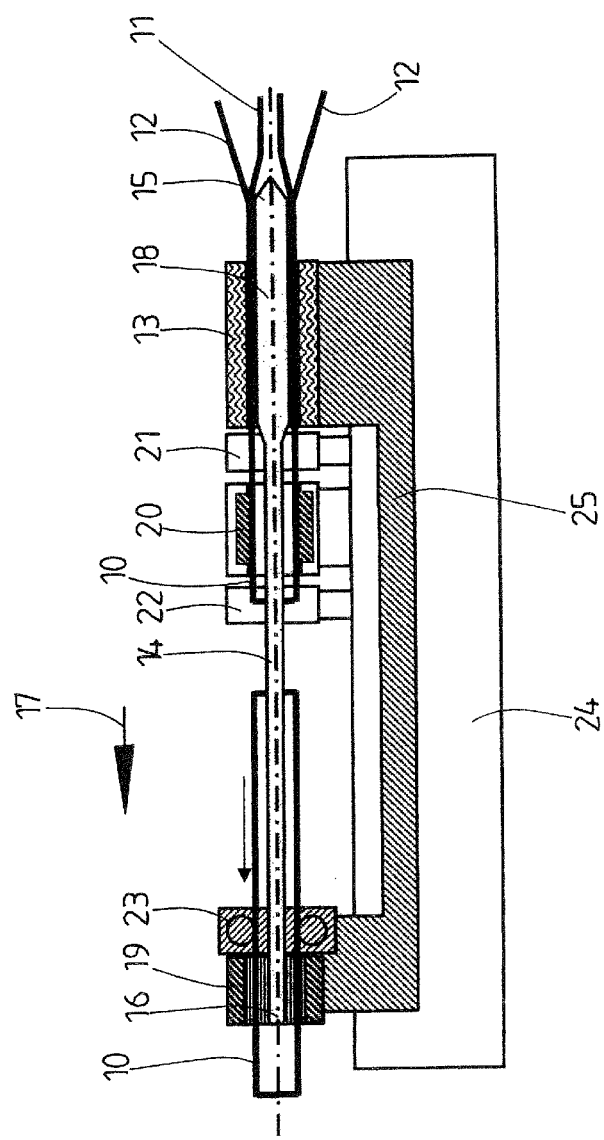

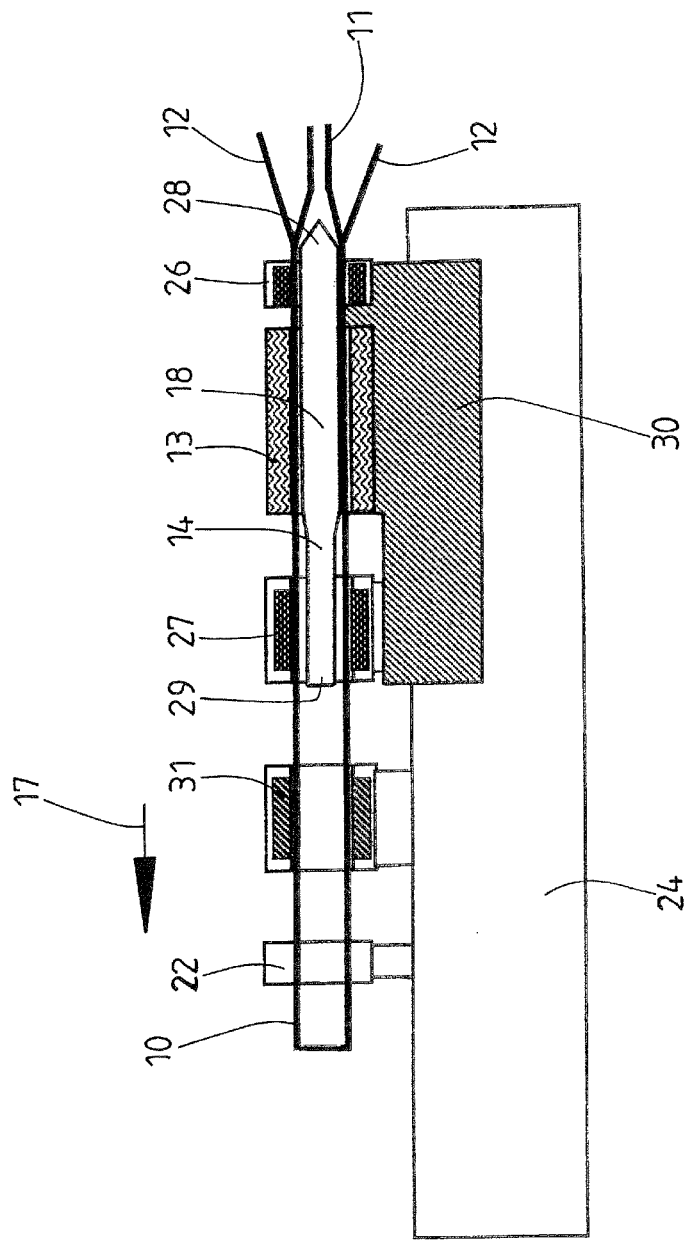

METHOD AND DEVICE FOR PRODUCING A HOLLOW PLASTIC OBJECT HAVING AT LEAST ONE TRANSVERSE REINFORCEMENT

STATEMENT OF RELATED APPLICATIONS

This application is the US National Phase of International Application No. PCT/EP2013/001719 having an international Filing Date of 12 Jun. 2013, currently pending, which claims priority on German Patent Application No. 10 2012 012 126.1 having a filing date of 20 Jun. 2012 and German Patent Application No. 10 2012 018 429.8 having a filing date of 18 Sep. 2012.

BACKGROUND OF THE INVENTION

Technical Field

The invention relates to a method for producing a hollow plastic object having at least one transverse reinforcement, namely, a method for producing a hollow plastic object having at least one transverse reinforcement, wherein the plastic object is formed by a mold and a core, and the transverse reinforcement is guided over the core. Furthermore, the invention relates to a device for producing a hollow plastic object having at least one transverse reinforcement, namely, a device for producing a hollow plastic object having at least one transverse reinforcement and having a mold and a core which runs through the mold.

Prior Art

A core is required for producing hollow plastic objects. Up to now such a core is held in front of the mold. If the plastic profile has at least one transverse reinforcement of high-tensile braided, warp-knitted or otherwise linked glass or carbon fibers, on account of the core being held in front of the mold it is not possible to pull such a transverse reinforcement in the form of a prefabricated closed tube over the core. In this case, the transverse reinforcement has to be produced around the core, between the mold and the point at which the core is being held in front of the mold. Such transverse reinforcements can only be formed in limited lengths around the core, thus not permitting continuous production of comparatively long hollow plastic objects having at least one transverse reinforcement. Moreover, the formation of the transverse reinforcement around the core is more complex than a reinforcement tube which is prefabricated in the fashion of a semi-finished product.

BRIEF SUMMARY OF THE INVENTION

Proceeding therefrom, the invention is based on the object of providing a method and a device for producing in a simple manner a hollow plastic object having at least one transverse reinforcement.

A method for achieving the object mentioned is a method for producing a hollow plastic object having at least one transverse reinforcement, wherein the plastic object is formed by a mold and a core, and the transverse reinforcement is guided over the core, characterized in that the mold and the core are collectively moved in a periodic manner in relation to the hollow plastic object to be produced. Accordingly, it is provided that the mold and the core are collectively moved in a periodic manner in relation to the plastic object to be produced. The plastic profile to be produced is thus moved out of the mold and over the core in a phased manner.

It is preferably provided that the mold and the core are collectively moved back and forth in an intermittent manner, specifically in particular so as to alternate in and counter to the production direction. When moving forward in the production direction the plastic object to be produced or the plastic profile, respectively, is moved forward collectively with the mold and the core, while when moving back counter to the production direction the mold and the core are moved in relation to the preferably stationary plastic object, on account of which part of the freshly produced plastic object with a leading end exits from the mold and slides over the core.

In one preferred design embodiment of the invention the core is held at least on the end thereof which lies behind the mold when viewed in the production direction. On account thereof the core is subjected to a tensile load when, for removal of a new portion of the plastic object to be produced, the core and the mold are moved back counter to the production direction in relation to the stationary plastic profile. For this purpose the plastic object is retained behind the mold when the mold and the core are being moved back, since the plastic object has to slide through the mold and over the core.

A further method for achieving the object mentioned is a method for producing a hollow plastic object having at least one transverse reinforcement, wherein the plastic object is formed by a mold and a core, and the transverse reinforcement is guided over the core, characterized in that the core is held at least on one end region which is behind the mold when viewed in the production direction, wherein this may also be a preferred refinement of the method described above. It is provided according to this method that the core is held at least on one end region which is behind the mold when viewed in the production direction. On account thereof, fixation of the core is reversed, so to speak, on account of which no disruptive core holder is required in front of the mold and the transverse reinforcement can thus be applied as a prefabricated reinforcement tube (semi-finished product) onto the end of the core which lies in front of the mold.

It is preferably provided that the core is either mechanically held, in particular supported, or held in a non-contacting manner.

If the core is mechanically held or supported, respectively, this takes place on its end region which is located behind the mold when viewed in the production direction by at least one core holder. It is in this case no longer required for the commencement region of the core which is located in front of the mold to be mechanically held, for example by way of a core holder, such that for example a reinforcement tube which has been prefabricated can be slid in the form of a semi-finished product over the commencement region of the core which is exposed in front of the mold.

If the core is held in a non-contacting manner by at least one core holder, this being preferably performed in a magnetic manner, a direct mechanical connection between the core holder and the core is no longer required. In this case, such a non-contacting core holder may be located behind the mold and/or in front of the mold. Preferably, a non-contacting core holder, in particular one that operates in a magnetic manner, is provided both in front of and behind the mold. Since such non-contacting core holders do not directly touch the core, they do not prevent the mounting of a prefabricated reinforcement tube on the front end region of the core in front of the mold, even when a non-contacting core holder is located in front of the mold.

According to a preferred refinement of the method it is provided that the plastic profile is in phases held behind the mold by at least one gripper. On account thereof, the finished plastic profile can be pulled over the core. In the event that the core is mechanically held on its region which is located behind the mold, the at least one gripper preferably is located between the core holder and the mold. In the case of non-contacting core holders the at least one gripper may be disposed behind the in particular magnetic core holder which is downstream of the mold when viewed in the production direction.

An advantageous alternative design embodiment of the method provides that the plastic object behind the mold is pulled through the mold and over the core by at least one displaceable gripper. This design embodiment of the method permits a stationary arrangement of the mold and of the core. Above all, in the case of this variant of the invention the core and the mold do not have to be periodically moved back and forth.

It is preferably provided that the at least one displaceable gripper continuously pulls the plastic object over the core and through the mold. This simplifies the procedure of the method and may have an advantageous effect on the quality of the plastic object to be produced.

A device for achieving the object mentioned is a device for producing a hollow plastic object having at least one transverse reinforcement and having a mold and a core which runs through the mold, characterized in that the mold and the core or at least one gripper for the plastic object are assigned to a common displaceable slide. In this device the mold and the core are assigned to a common slide. The slide preferably is displaceable. On account of not only the mold but also the core being assigned to the slide, both components, namely the mold and the core, involved in shaping the hollow plastic object, in particular a tubular plastic profile or a plastic tube, can be displaced together with the plastic object or else in relation thereto.

It is preferably provided that the slide is also assigned at least one core holder. The core holder which is fastened on the slide establishes a connection to the preferably displaceable slide, on account of which the displacement movement of the slide is transmitted from the core holder to the core held thereby.

According to a preferred design embodiment of the device the slide is displaceable in and counter to the production direction of the plastic object. On account thereof, the mold and the core, the latter on account of its connection to the core holder, are displaceable by way of the slide in and counter to the production direction of the plastic object. The intermittent manner of production of the plastic profile is a result of this displaceability.

A further device, which may also be a preferred refinement of the abovementioned device, for achieving the object is a device for producing a hollow plastic object having at least one transverse reinforcement and having a mold and a core which runs through the mold, characterized in that the core is retainable by at least one core holder which lies behind the mold when viewed in the production direction. In the case of this device it is provided that the core is releasably held by at least one core holder which is disposed behind the mold. On account of the core being held behind the mold the possibility for sliding a prefabricated reinforcement tube which serves as a semi-finished product onto the core in front of the mold in order to form the transverse reinforcement is established.

On account of the fact that, if applicable, namely preferably, the core holder which is disposed behind the mold when viewed in the production direction is releasable from the core, the plastic object produced can be slid in portions over the end of the core which lies behind the mold and thereby be disengaged from the core.

The core holders may be configured in various ways. They are preferably configured so as to hold the core in a mechanical, clamping manner, or to hold the core in a non-contacting manner. However, other design embodiments of the core holder are also conceivable. If the core is mechanically held, this is performed only on the end region of the core which lies behind the mold. In this case, the mechanical core holder mechanically grips and thus supports the end region or the end of the core behind the mold. The commencement region of the core which lies in front of the mold may then be free for sliding on a semi-finished type reinforcement tube for the transverse reinforcement. In the case of a non-contacting fixation or support, respectively, of the core, this may take place on the end region of the core which lies behind the mold, but alternatively or additionally also in front of the mold, since the non-contacting support of the core permits the reinforcement tube for the transverse reinforcement to be slid onto the commencement region of the core which lies in front of the mold.

BRIEF DESCRIPTION OF THE DRAWINGS

Preferred exemplary embodiments of the invention are explained in more detail below by means of the drawing, in which:

FIG. 5 shows the device in an illustration which is analogous to FIG. 1, in a fifth method step; and FIG. 6 shows a device according to a second exemplary embodiment of the invention, in an illustration which is analogous to FIG. 1.

DETAILED DESCRIPTION OF PREFERRED EMBODIMENTS

Figure 1:
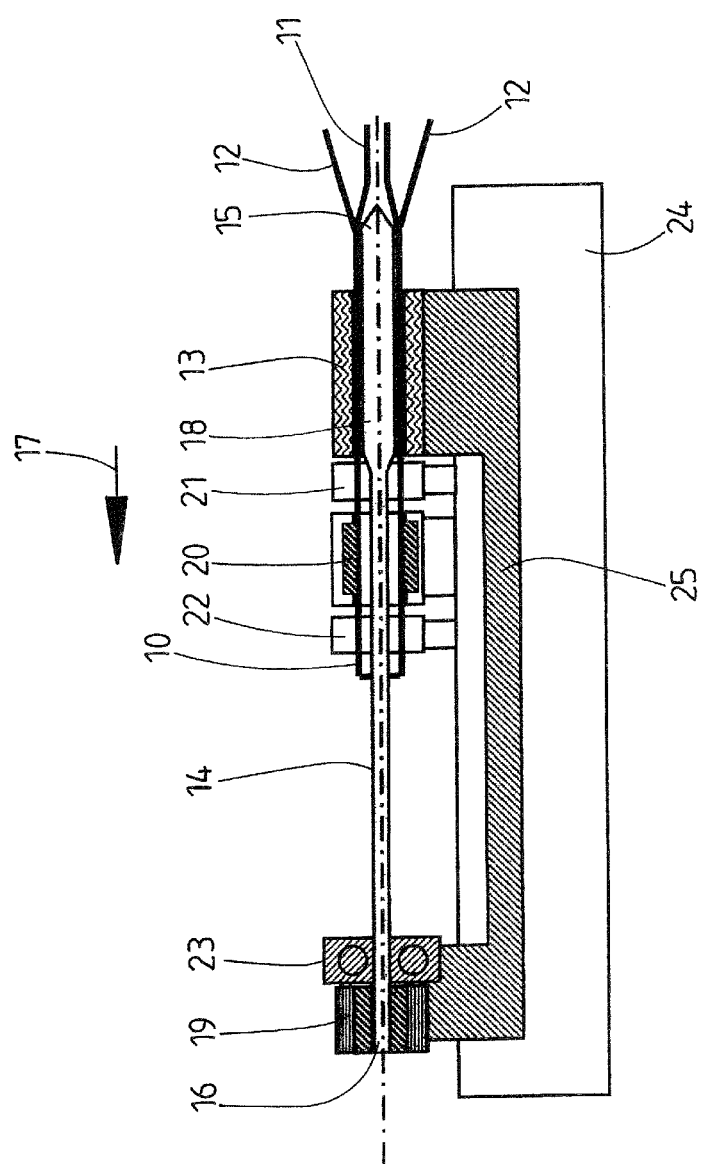
FIG. 1 shows a schematic illustration of a device in the vertical longitudinal section.

The devices shown serve for producing a hollow reinforced plastic object 10. The plastic object 10 which preferably is a tubular reinforced plastic profile or a reinforced plastic tube is only illustrated in a schematic manner in the figures. The invention in particular relates to a plastic object 10 having at least one transverse reinforcement 11. In the exemplary embodiment shown the plastic object 10 also disposes of longitudinal reinforcements 12. However, the invention is also suitable for plastic objects 10 which only have at least one transverse reinforcement 11 but do not dispose of a longitudinal reinforcement 12. The transverse reinforcement 11 preferably is a reinforcement tube which has been prefabricated as a semi-finished product.

The device for producing the plastic object 10 has a mold 13 and an elongate core 14. Both, the mold 13 and the core 14, may dispose of arbitrary cross sections. On account thereof, hollow plastic objects 10 with arbitrary profiles are producible, in that the mold 13 forms the outer cross section of the plastic object 10 and the core 14 forms the inner cross section.

The elongate core 14 disposes of a front end 15 and a rear end 16. The front end 15, when viewed in the production direction 17 of the plastic object 10, is located in front of the mold 13, while the rear end 16 of the core 14, when viewed in the production direction 17, is located behind the mold 13, that is to say at a distance in front of that side of the mold 13 from which the hollow plastic object 10 produced exits.

In the exemplary embodiment shown the elongate core 14 behind the mold 13 is provided with a reduced dimension, namely is smaller or tapered, respectively. On account thereof, the core 14 bears on the inner side of the hollow plastic object 10 only in the region of the mold 13 or else slightly therebeyond. Accordingly, when the plastic object 10 leaves the mold 13, the former is no longer supported on the outside by the mold 13 and also no longer held or shaped in a supporting manner, respectively, on the inside by the core 14. However, it is conceivable for the shaping region 18 of the core 14 which is involved in the shaping of the inner profile of the plastic object 10 to be configured so as to be longer than the mold 13, or, deviating from the illustrations in the figures, for the core 4 to be not at all constricted behind the mold 13, such that the core 14 has an identical cross section along its entire length.

In the case of the exemplary embodiment of the device shown in FIGS. 1 to 5, the core 14 is mechanically held by a core holder 19 only on a rear end 16 which when viewed in the production direction 17 is downstream of the mold 13. However, the core holder 19 is configured such that it can be released from the rear end 16 of the core 14, so that between the core 14 and the opened core holder 19 a portion of the completed hollow plastic object 10 can be slid over the rear end 16 of the core 14. On account of the arrangement of the core holder 19 on the rear end 16 of the core 14, the front end 15 of the core 14, which lies in front of the mold 13 in the production direction 17, remains free. On account thereof, the reinforcement tube which forms a transverse reinforcement 11 in front of the mold 13 can be slid or mounted, respectively, over the front end 15 which lies in front of the mold 13 onto the core 14.

The device of FIGS. 1 to 5 disposes of a gripper 20 which when viewed in the production direction 17 is disposed behind the mold 13 or, in other words, is downstream of the mold 13. If applicable, the device may also dispose of a plurality of grippers 20 which succeed one another at a distance or else directly in the production direction 17. The single gripper 20 shown in the figures serves for temporarily acquiring the plastic object 10, specifically on the outside. The gripper 20 can thus acquire the plastic object 10 from the outer side. The gripper 20 is configured such that it can be opened, so that it selectively acquires the plastic object 10 externally and on account thereof holds or clamps it, respectively, or is detached from the plastic object 10 such that no connection exists anymore between the plastic object 10 and the gripper 20.

In the case of the device shown here a cooling unit 21 is provided behind the mold 13. Such a cooling unit 21 is not mandatory. Devices without a cooling unit 21 are conceivable.

The device furthermore disposes of a separation unit 22, for example a saw, which severs from the plastic object 10 which is preferably produced in a continuous manner a portion having the desired length. The separation unit 22 is downstream of the gripper 20 in the production direction 17. A drawing-off unit 23 for conveying away the portion of the plastic object 10, which is severed from the latter, which is produced as a continuous strand by the separation unit 22, cooperates with the separation unit 22. In the exemplary embodiment shown, the drawing-off unit 23 is disposed so as to be close in front of the core holder 19. The drawing-off unit 23 may thus also be located at another spot. It is also conceivable for a plurality of drawing-off units 23 to be provided in succession to one another.

In the case of the device shown in FIGS. 1 to 5, the mold 13 and the core 14, by way of a slide 25 which is displaceably mounted on the machine frame 24, are collectively movable back and forth in a periodic manner in and counter to the production direction 17. To this end, the mold 13 and the core holder 19 are connected to the slide 25. When the slide 25 is displaced along the production direction 17 on the machine frame 24, the mold 13 and the core 14 with the core holder 19 are displaced conjointly and to the same extent.

In the case of the device shown here, the drawing-off unit 23 is also mounted on the slide 25 and is thus also displaceable by the slide 25.

In the case of the device of FIGS. 1 to 5, the gripper 20 is mounted in a stationary manner on the machine frame 24. In contrast to the mold 13, the core 14 and the core holder 19, the gripper 20 in the case of the shown exemplary embodiment is thus not displaceable along the production direction 17. The optionally existent cooling unit 21 and the separation unit 22 are also connected in a non-displaceable manner to the machine frame 24 in the case of the device shown.

The method according to the invention is described in more detail by means of the device of FIGS. 1 to 5:

In the case of methods explained in the mentioned figures, the hollow plastic object 10 which has at least the transverse reinforcement 11 is intermittently produced as a tubular plastic profile or plastic tube in that portions of the completed plastic object 10 which correspond to approximately at most the length of the mold 13 in the production direction 13 are always pulled bit-by-bit in the production direction 17 from the mold 13 and over the core 14. In the case of this method, the plastic object 10 is thus produced according to the pilgrim-step method, so to speak.

The at least one transverse reinforcement 11 which preferably is prefabricated as a semi-finished product from braided, woven or warp-knitted fibers of preferably high tenacity is pulled as a reinforcement tube over the unsupported exposed front end 15 onto the core 14. Moreover, the longitudinal reinforcements 12 are added in the region of the front free end 15 of the core 14. In the heated mold 13, liquid plastic, in the case of pultrusion preferably a duroplastic material, is added to the mold 13, and in the mold 13 the at least one transverse reinforcement 11 and the longitudinal reinforcement 12 are embedded in the plastic matrix. Alternatively, it is also conceivable for the at least one transverse reinforcement 11 and/or the longitudinal reinforcements 12 to be impregnated with plastic in front of the mold 13, that is to say prior to entering the mold. This may take place in a bath or an impregnation unit, wherein the plastic may be a thermoplastic material or a duroplastic material. Moreover, it is conceivable for the at least one transverse reinforcement 11 and/or the longitudinal reinforcements 12 to be provided with solid plastic, preferably a thermoplastic material, which is thus added to the mold 13 as a solid component of the reinforcements in the form of co-mingled or co-woven material and then melts or is melted in said mold 13.

The finished plastic object 10 exits from the mold 13 in the production direction 17. The core 14 tapers off when exiting the mold 13, so that the shaping of the interior cross section of the plastic object 10 by way of the core 14 is rescinded behind the mold 13. The plastic object 10, when leaving the mold 13, is cured to such an extent that it keeps its shape, specifically the outer and the inner cross section. However, the plastic object 10 still has a comparatively high temperature which is lowered to about room temperature by the cooling unit 21 which is downstream of the mold 13.

During production of the plastic object 10 the rear end 16 of the core 14, which lies behind the mold 13, is supported by the core holder 19.

FIG. 1 already shows a partially finished plastic object 10 which has left the mold 13 and extends through the cooling unit 21, the gripper 20 and the separation unit 22. Proceeding from FIG. 1, further portions of the plastic object 10 are intermittently produced such that the length of the latter increases bit-by-bit.

Figure 2:
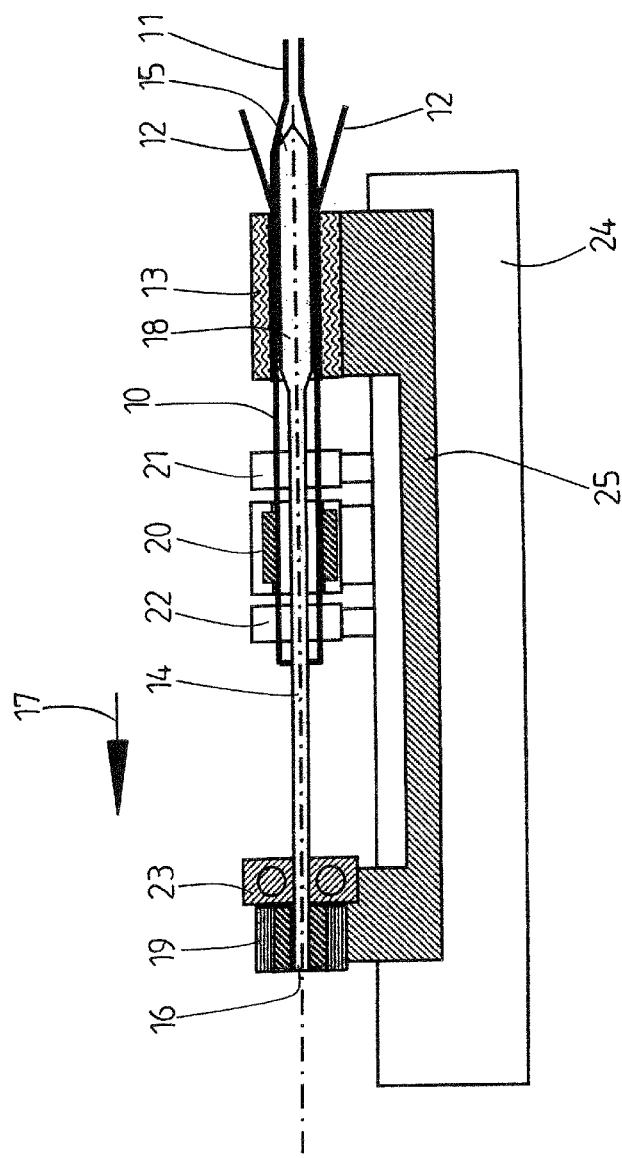
FIG. 2 shows the device in an illustration which is analogous to FIG. 1, in a second method step.

FIG. 2 shows a production step of the plastic object 10 which follows on from the illustration of FIG. 1 and in which the slide 25 with the mold 13, the core 14, the core holder 19 and the drawing-off unit 23 is moved back, counter to the production direction 17, by a distance along the latter in relation to the machine frame 24. This distance corresponds to the portion of the plastic object 10 which is newly produced in each method cycle. Here, the mold 13 moves away from the gripper 20, the cooling unit 21 and the separation unit 22. When moving back the mold 13 with the core 14 counter to the production direction 17, the gripper 20 retains a short region of the plastic object 10 which is already located outside the mold 13. In this manner, part of the plastic object 10 is pulled out of the mold 13 and the core 14 in the upper plastic object 10 is moved back to the same extent when the slide 25 with the mold 13 and the core 14 is moved back counter to the production direction 17. Here, during the backward movement of the mold 13 and of the core 14 counter to the production direction 17 a relative movement of the mold 13 and of the core 14 occurs in relation to the plastic object 10 which is held by the stationary gripper 20.

Figure 3:
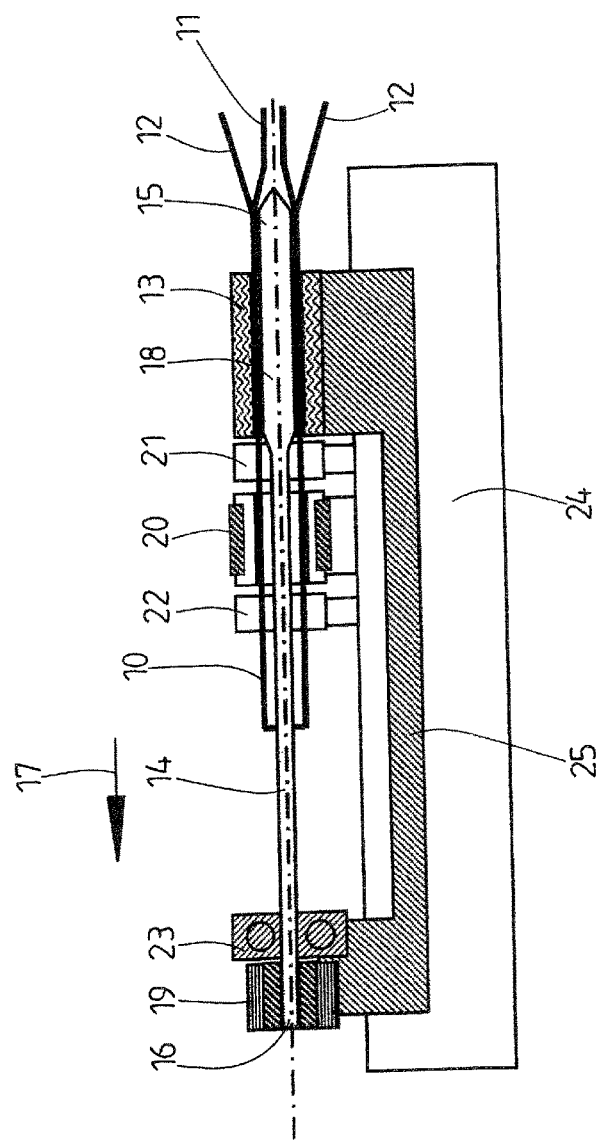
FIG. 3 shows the device in an illustration which is analogous to FIG. 1, in a third method step.

In the second step shown in FIG. 3, upon opening of the gripper 20 and when the gripper 20 is open, the mold 13 and the core 14 are moved forward conjointly with the core holder 19, again in the production direction 17, specifically by the same stretch by which the mold 13 and the core 14 with the core holder 19 previously have been moved back by the slide 25 in relation to the machine frame 24. In the case of this forward movement of the mold 13 and of the core 14 there is no relative movement of the mold 13 and of the core 14 in relation to the plastic object 10. Therefore, the plastic object 10 is entrained during the forward movement of the mold 13 and of the core 14 in the production direction 17. After the forward movement of the mold 13 and of the core 14 with the plastic object 10, the device is again located in the initial position of FIG. 1. Only the length of the plastic object 10 protruding from the mold 13 has been increased, specifically by such a portion by which the mold 13 with the core 14 initially has been moved back and subsequently been moved forward again by the same stretch. A comparison of FIGS. 1 to 3 clarifies the length of the plastic object 10 which increases in the case of each cycle according to FIGS. 1 to 3.

Figure 4:
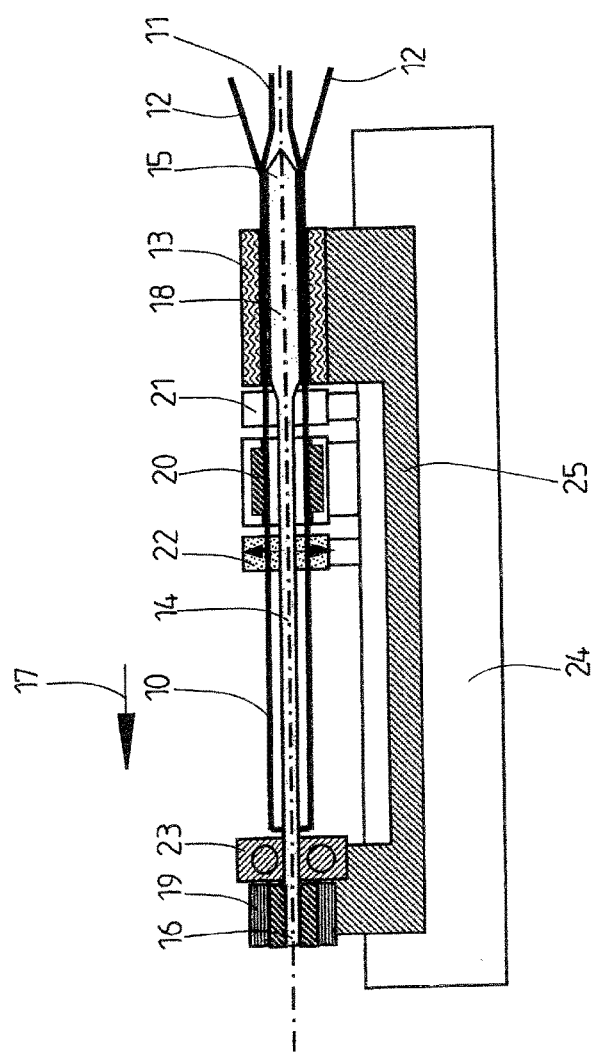
FIG. 4 shows the device in an illustration which is analogous to FIG. 1, in a fourth method step.

FIG. 4 clarifies the severing of a portion of the finished hollow plastic object 10 from the strand of the hollow plastic object 10 which has been produced by a plurality of successive cycles of FIGS. 1 to 3. Accordingly, the plastic object 10 is severed or sawn off, respectively, directly behind the gripper 20 from the plastic object 10 which is still located in the region of the gripper 20. The portion of the hollow plastic object 10 which in the production direction 17 is located in front of the separation unit 22 may here be held and thus fixated by the gripper 20 on its end which faces toward the separation unit 22.

Upon the portion of the plastic object 10 which has a desired length having been severed from the continuous strand of the plastic object 10 by the separation unit 22, the cut-off portion of the plastic object 10 is drawn off from the core 14 over the rear end 16 of said core 14 in the production direction 17 by means of the drawing-off unit 23. In order for the plastic object 10 to be able to be drawn off from the core 14, the core holder 19 is opened in a sufficiently wide manner during this conveying process that the severed portion of the plastic object 10 can be conveyed away through the core holder 19 over the rear end 16 of the core 14 (FIG. 5). The core holder 19 is subsequently closed again and, on account thereof, the rear end 16 of the core 14 is again retained by the core holder 19.

A refinement of the method in which the core 14 is additionally, above all radially, positionable or centerable in relation to the mold 13 by way of dynamic non-contacting positioning of the core 14 in relation to the mold 13 is conceivable.

FIG. 6 shows a second exemplary embodiment of the device. This device disposes of two non-contacting core holders 26 and 27, specifically in each case one core holder 26 in front of the mold 13 and one core holder 27 behind the mold 13. On account of the non-contacting core holders 26 and 27, the core is held in a floating manner on the front end 28 which lies in front of the mold 13 and on the rear end 29 which lies behind the mold 13. Alternatively, it is conceivable for one non-contacting core holder 27 for holding the core 14 in a floating manner to be only provided behind the mold 13, as in the case of the first exemplary embodiment. Preferably, the core is magnetically held in a closed magnetic field by the core holders 26 and 27. Here, the core 14 so to speak represents the magnetic slider of a linear motor which is operated in a static holding pattern. Preferably, the magnetic fields are controllable for the fine positioning of the core 14 in the mold 13. On account thereof, a consistency in the wall thicknesses of the hollow plastic object 10 to be produced is ensured; in particular, identical wall thicknesses can be implemented in this manner, if desired, across the entire circumference of the hollow plastic object 10.

In the case of the exemplary embodiment of FIG. 6, the two non-contacting core holders 26 and 27 and the mold 13 are assigned to a slide 30 which is displaceable in relation to the machine frame 24 in the production direction 17 and counter to the production direction 17, as is the case in the exemplary embodiment of FIGS. 1 to 5.

In the production direction 17 a gripper 31 follows on preferably at some spacing from the core holder 27 which is disposed behind the mold 13, which gripper 31 retains the cured hollow plastic object 10 when the slide 30 is moved back counter to the production direction 17 with the mold 13, the core 14 and the core holders 26 and 27, such that the plastic object 10 here is pulled through the mold 13 and over the core 14 and is thus demolded in portions.

In the production direction 17 the separation unit 22 follows on from the gripper 31, as in the case of the exemplary embodiment of FIGS. 1 to 5. A drawing-off unit may be dispensed with in the case of this exemplary embodiment, since the separation unit 22 severs a portion of the plastic object 10 behind the core holder 27 which is located behind the mold 13 and also behind the rear end 29 of the core 14. However, it is also conceivable in the case of the device shown in FIG. 6 for a drawing-off unit 23 to be provided.

The method for producing the hollow plastic object 10 in the case of the device shown in FIG. 6 in principle proceeds exactly as in the case of the device of FIGS. 1 to 5, so that reference is made to the method described in that context.

A further (third) exemplary embodiment of the invention which is not shown provides for the plastic object to be preferably continuously pulled through the mold and over the core by a gripper.

In the case of a device in which the gripper pulls the produced hollow plastic object through the mold and over the core, the mold and the core including the at least one core holder are fixedly mounted on the machine frame. In the case of this device, the mold, the core and the at least one core holder consequently are not movable back and forth in the production direction. Instead, in the case of this device at least the one gripper is assigned to a slide and in relation to the machine frame is displaceable by the slide in opposite directions.

If the gripper is moved forward in the production direction, the plastic object is pulled through the mold and over the core by the gripper.

When the at least one gripper has reached the end of its displacement path along the machine frame it releases the plastic object and moves back empty in front of the mold. From this initial position the gripper is displaced again by the slide in relation to the machine frame in the production direction, whereby said gripper continuously pulls the plastic object through the mold and over the core.

A cooling unit may be fixedly disposed behind the mold. It is conceivable in this case for the cooling unit to be displaced on the slide with the at least one gripper. The same applies to a separation unit which is configured as a saw, for example. This separation unit which is disposed behind the gripper may be displaceable with the gripper, or else be located in a locationally fixed manner in front of the core holder which is fixedly mounted on the machine frame. Likewise, a drawing-off unit may follow on from the separation unit in the production direction.

In the case of the device described above the method proceeds in that the core is mechanically held by a core holder either only at the rear end which is located behind the mold, such that the front end which is located in front of the mold is free and a transverse reinforcement which is configured as a reinforcement tube can be slid thereonto, or the core is held by at least one non-contacting core holder, in particular by at least one magnetic field.

The plastic object is continuously pulled through the mold and over the core by at least one gripper which is located behind the mold. The gripper here is displaced on the machine frame in the production direction by the slide which supports said gripper. In contrast to the method described above, in the case of this method the hollow plastic object is not formed in a cyclical manner or in successive steps, but in a continuous manner until the gripper with the slide has reached the end of the displacement path on the machine frame.

In the case of the hollow plastic object which is pulled through the mold and over the core by the gripper, the mold and the core, just like the respective core holder, remain locationally fixed; they are thus not displaced by the slide. To this end, the mold and the core with the core holder may be fixedly connected to the machine frame.

When the gripper with the slide has reach the end of the displacement path on the machine frame, the gripper is briefly released from the plastic profile and moved back counter to the production direction, specifically so far that the gripper is located at the smallest possible spacing behind the mold. While the gripper which is released from the hollow plastic object moves back, the plastic object, together with the mold and the core, is stationary.

Also in the case of this method hollow plastic objects of practically infinite length, in particular closed tubular plastic profiles, may be produced. However, in the event of portions of plastic objects having specific lengths being desired, the plastic object following on from the gripper in the production direction (i.e. lying behind the gripper) may be severed by the separation unit preferably after the gripper has closed in on the mold. The severed portion of the plastic object may then be optionally conveyed away by a drawing-off unit, as in the case of the method described above, specifically optionally through the mechanical core holder at the rear end of the core, which to this end is opened.

LIST OF REFERENCE SIGNS

10 Plastic object
11 Transverse reinforcement
12 Longitudinal reinforcement
13 Mold
14 Core
15 Front end
16 Rear end
17 Production direction
18 Shaping region
19 Core holder
20 Gripper
21 Cooling unit
22 Separation unit
23 Drawing-off unit
24 Machine frame
25 Slide
26 Core holder
27 Core holder
28 Front end
29 Rear end
30 Slide
31 Gripper

What is claimed is:

1. A method for producing a hollow plastic object (10) having at least one transverse reinforcement (11), wherein the plastic object (10) is formed by a mold (13) and a core (14), and the transverse reinforcement (11) is guided over the core (14), and wherein the mold (13) forms the outer cross-section of the hollow plastic object (10), the method comprising:

mechanically holding the core (14) on at least one end region which is downstream of the mold (13), when viewed in the production direction (17), by at least one core holder (19), wherein the core holder (19) is configured to be selectively released from the core (14);

collectively moving the mold (13) and the core (14) in a periodic manner, or an intermittent manner, in relation to the hollow plastic object (10) to be produced; and collectively moving the mold (13) and the core (14), with the hollow plastic object (10) produced, in the production direction (17).

2. The method as claimed in claim 1, further comprising holding the core (14) on at least the rear end (16, 29) thereof, which is leading when viewed in the production direction, and which lies downstream of the mold (13) when viewed in the production direction (17).

3. The method as claimed in claim 1, further comprising retaining the plastic object (10), on a rear end region which lies downstream of the mold (13), when viewed in the production direction (17), when the mold (13) and the core (14) are being moved back counter to the production direction (17).

4. The method as claimed in claim 1, wherein the plastic object (10) is occasionally or periodically held by a gripper (20, 31) downstream of the mold (13) when viewed in the production direction (17).

5. The method as claimed in claim 1, wherein the plastic object (10), downstream of the mold (13), is pulled through the mold (13) over the core (14) by at least one displaceable gripper, and wherein the plastic object (10) is continuously pulled over the core (14) and through the mold (13) by the at least one displaceable gripper.

6. A method for producing a hollow plastic object (10) having at least one transverse reinforcement (11), wherein the plastic object (10) is formed by a mold (13) and a core (14), and the transverse reinforcement (11) is guided over the core (14), and wherein the mold (13) forms the outer cross-section of the hollow plastic object (10), the method comprising:

mechanically holding the core (14) on at least one end region which is downstream of the mold (13), when viewed in the production direction (17), by at least one mechanical core holder (19), wherein the mechanical core holder (19) is configured to be selectively released from the core (14);

collectively moving the mold (13) and the core (14) in a periodic manner, or an intermittent manner, in relation to the hollow plastic object (10) to be produced; and collectively moving the mold (13) and the core (14), with the hollow plastic object (10) produced, in the production direction (17). wherein the core (14) is held in a non-contacting manner, via a magnetic force, on the end region downstream of the mold (13) by the at least one core holder (27), and wherein the core (14) is held in a non-contacting manner, via a magnetic force, on a front region, opposite the end region of the mold (13), by a second core holder (26).

* * * * *